(12) United States Patent
Groom et al.

(10) Patent No.: US 7,854,778 B2
(45) Date of Patent: Dec. 21, 2010

(54) INTAKE DUCT

(75) Inventors: Alec R. Groom, Bristol (GB); John Christopher Hacker, Bristol (GB); Jonathan Wilson, Bristol (GB); Gareth L. Jones, Caldicot (GB)

(73) Assignee: Rolls-Royce, PLC, London (GB)

( * ) Notice: Subject to any disclaimer, the term of this patent is extended or adjusted under 35 U.S.C. 154(b) by 1044 days.

(21) Appl. No.: 11/304,767

(22) Filed: Dec. 16, 2005

(65) Prior Publication Data

US 2006/0223429 A1  Oct. 5, 2006

(30) Foreign Application Priority Data

Dec. 23, 2004 (GB) ................. 0428205.9
Nov. 21, 2005 (GB) ................. 0523585.8

(51) Int. Cl.
*B01D 45/12* (2006.01)
*B01D 45/00* (2006.01)

(52) U.S. Cl. ..................... 55/306; 60/39.092
(58) Field of Classification Search ........... 454/121, 454/126, 143, 304; 60/39.092; 55/306
See application file for complete search history.

(56) References Cited

U.S. PATENT DOCUMENTS

| | | | | |
|---|---|---|---|---|
| 1,621,356 A | * | 3/1927 | Dickey | 105/350 |
| 1,955,088 A | * | 4/1934 | Pine et. al. | 454/116 |
| 3,136,239 A | * | 6/1964 | Geiger | 454/137 |
| 3,257,928 A | * | 6/1966 | Toplarski | 454/126 |
| 4,456,458 A | * | 6/1984 | Gilbertson | 55/306 |
| 4,509,962 A | * | 4/1985 | Breitman et al. | 55/306 |
| 4,527,387 A | * | 7/1985 | Lastrina et al. | 60/39.092 |
| 4,531,671 A | * | 7/1985 | Schwenk | 237/12.3 B |
| 4,617,028 A | * | 10/1986 | Ray et al. | 95/267 |
| 4,860,534 A | * | 8/1989 | Easley et al. | 60/39.092 |
| 4,972,672 A | * | 11/1990 | Sanderson et al. | 60/39.092 |
| 5,139,545 A | * | 8/1992 | Mann | 55/306 |
| 5,257,498 A | * | 11/1993 | Nikkanen et al. | 60/39.093 |
| 5,326,315 A | * | 7/1994 | Inoue et al. | 454/126 |
| 5,699,851 A | * | 12/1997 | Saida et al. | 165/42 |
| 6,079,484 A | * | 6/2000 | Uemura et al. | 165/42 |
| 6,270,400 B1 | * | 8/2001 | Tsurushima et al. | 454/121 |
| 6,293,339 B1 | * | 9/2001 | Uemura et al. | 165/203 |
| 6,692,347 B1 | * | 2/2004 | Schneider | 454/158 |
| 6,969,237 B2 | * | 11/2005 | Hudson | 416/97 R |
| 7,296,395 B1 | * | 11/2007 | Hartman et al. | 60/39.092 |

FOREIGN PATENT DOCUMENTS

| | | |
|---|---|---|
| GB | 529057 A | 11/1940 |
| GB | 663194 A | 12/1951 |
| GB | 1474390 A | 5/1977 |
| WO | WO 02/12690 A1 | 2/2002 |

* cited by examiner

*Primary Examiner*—Steve McAllister
*Assistant Examiner*—Helena Kosanovic
(74) *Attorney, Agent, or Firm*—Oliff & Berridge, PLC

(57) ABSTRACT

An intake duct for a compressor comprises an inlet and an outlet means. The duct has a serpentine path. The outlet means comprises a first outlet and a second outlet. The duct further comprises at least one grille member configured to prevent the passage of objects over a predetermined size which is positioned in the duct out of the line of sight when viewed through the inlet. The duct is shaped such that in operation objects passing through the at least one grille member greater than a predetermined mass are directed towards the first outlet and the remainder of the objects are directed towards the second outlet. The first outlet leads overboard and/or to a trap and the second outlet leads to a compressor.

18 Claims, 2 Drawing Sheets

INTAKE DUCT

Figure 1:
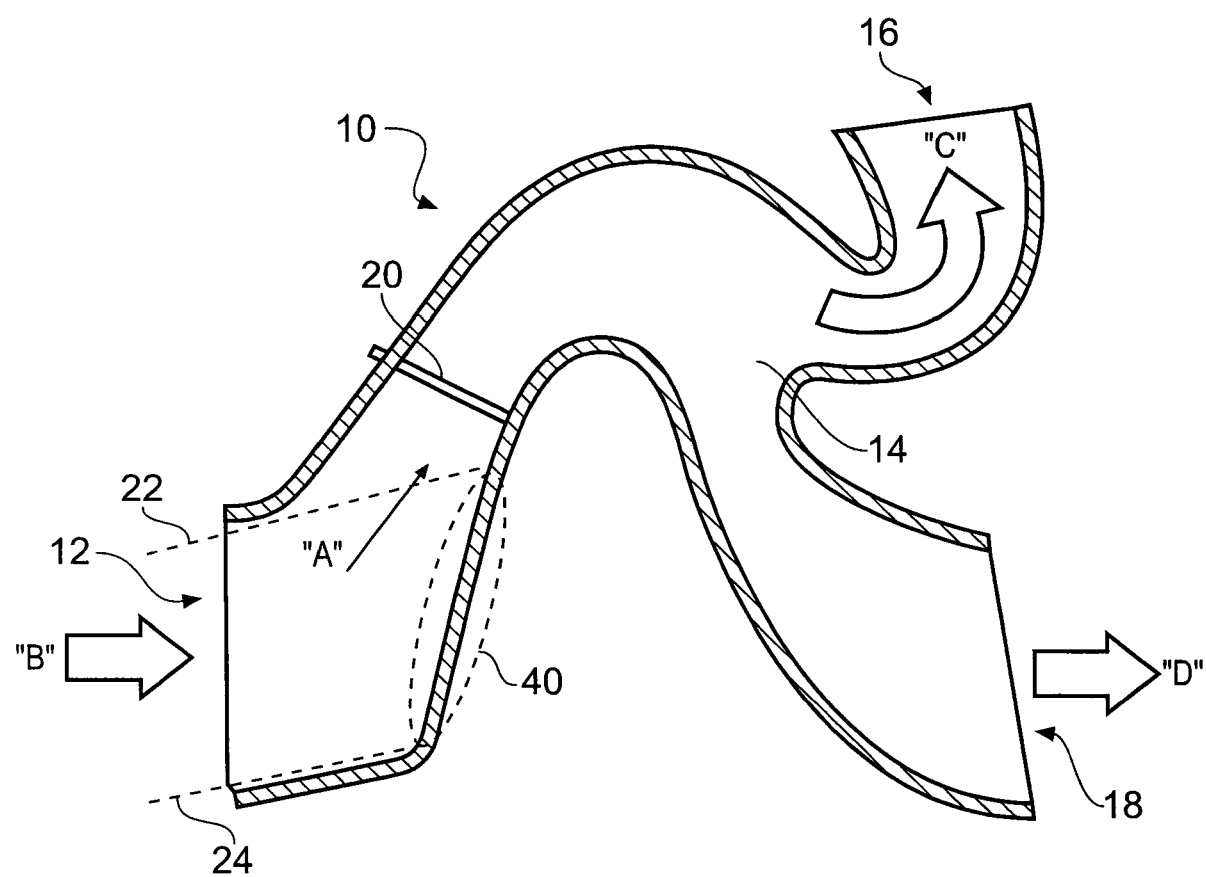

The invention relates to an intake duct.

In particular it relates to an intake duct having a serpentine path and which includes a grille member configured to prevent the passage of objects over a predetermined size.

Compressors and such like devices which draw in fluid from an uncontrolled source (eg air from the atmosphere, water from an ocean, lake or river) are at risk from Foreign Object Damage (FOD). Since the fluid source is not filtered it may contain many different types of foreign objects which can cause damage to the compressor. Moveable turbo machinery, such as that fitted to aeroplanes or helicopters, is especially at risk because they draw in air on the ground, close to the ground and whilst in motion and so are exposed to a wider range of foreign object hazards than permanently stationary turbo machinery. It is known to employ inlet particle separators on the inlet end of the compressor for the engines of such vehicles. These tend to take the form of a duct with a serpentine path, with a "Y" branch. One branch of the inlet particle separator is arranged in a position where air and air borne particles will flow, the other branch is positioned where larger objects (such as rocks, nuts, bolts etc) will be directed by virtue of their inherent larger momentum. In this way it is possible to separate large objects from bulk air flow and the smaller air borne particles. The larger foreign objects are then directed along one branch to a trap or dumped overboard while the intake air is directed along the other branch to the compressor.

A problem arises with such inlet particle separators when a very large foreign object, such as a bird, enters the intake duct. They will not necessarily be carried along the path as other heavy objects would be because they may be either too large to travel along the duct freely or will be partially stuck to the duct surface. Either way, the object will be drawn towards the compressor by virtue of the suction action of the compressor, and will not move with sufficient speed to be "thrown" out of the bulk gas flow in the same way as a free moving foreign object would be. Upon arrival at the compressor, the foreign object may cause considerable damage, resulting in engine failure.

This problem has been solved to some extent by placing meshes or grilles over the entrance to the intake, thereby providing an obstruction and preventing objects over a predetermined size (that is to say, a size likely to cause damage to the engine) from entering the intake duct at all. Such devices must be robust enough to resist the impact of the foreign object and yet must not obstruct the gas flow path nor effect the aerodynamics of the intake duct or the aircraft. Should the device become damaged, not only will it cease to provide protection for the compressor, but may introduce extra foreign objects into the gas stream, thereby increasing the risk to the aircraft. A robust grille or mesh will tend to be heavy. Strict weight restrictions are commonly imposed on aircraft and engine design and so a heavy grille or mesh, regardless of how robust it is, is not a favoured option.

Hence a device which prevents the ingress of large foreign objects into a compressor, which is inherently light weight and that will not obstruct the gas flow nor affect the aerodynamics of the engine, aircraft or other vehicle it is attached to, is highly desirable.

According to the present invention there is provided an intake duct for a compressor comprising an inlet and an outlet means and there between a serpentine path, the outlet means having a first outlet and a second outlet wherein said duct further comprises at least one grille member configured to prevent the passage of objects over a predetermined size and said at least one grille member is positioned in the duct out of the line of sight when viewed through the inlet, and the duct is shaped such that in operation objects passing through the at least one grille member greater than a predetermined mass are directed towards the first outlet and the remainder of the objects are directed towards the second outlet.

The invention provides a means that prevents the passage of objects which are considered to have size, mass or consistency that will enable them to cause damage components downstream of an intake, for example rotor blades on a compressor for a gas turbine engine or a water pump. That is to say the grille prevents the passage of very large objects, but allows the passage of objects which either have sufficient mass to be directed to the first outlet or has small enough mass to not cause damage to the compressor and hence be directed to the second outlet. The present invention utilises a grille member mounted out of the line of sight of the inlet and hence the foreign object entering the intake will impact on the duct wall before reaching the grille. Hence the object will either be broken into pieces considered small enough not to cause damage to the components downstream or will prevent the passage of the foreign object beyond the grille member. This means the grille member need only be strong enough to stop the compressor from sucking the object past it, and does not need to be able to withstand a collision impact force with the foreign object. This also means the grille members can be smaller and will provide less of an obstruction to the fluid flow through the intake than conventional intake grille members. As the grille member is mounted to the inside of the intake, it will not affect the aerodynamics of the outside of the intake and/or vehicle it is attached to.

Preferably the first outlet is upstream of the second outlet. That is to say the first outlet is closer to the inlet than is the second outlet.

Preferably the first outlet leads overboard and/or to a trap. That is to say the first outlet either provides an exit from the duct for objects or contains/holds them in a trap while fluid carrying the objects is exhausted from the duct or delivered to the compressor.

Preferably the at least one grille member is a mesh. That is to say the members making up the grille cross over to form a net like structure. Such structures are strong and are easily manufactured to provide gaps which allow only objects of a predetermined preferable size to pass.

Preferably the or each grille member is a filament which extends across the duct. That is to say the members making up the grille are flexible strands of a strong material, such as steel, alloys of steel, Kevlar wire or nylon. Such a structure is simple to manufacture, provides very little obstruction to fluid flow and is extremely lightweight.

Preferably the grille member comprises a braided structure that extends across the duct. That is to say the members making up the grille are woven out of flexible strands of a strong material, such as steel, alloys of steel, Kevlar wire or nylon. Such structures are extremely strong, provide very little obstruction to fluid flow and are extremely lightweight.

Preferably the or each grille member is a bar which extends across the duct. That is to say the members making up the grille are rigid or flexible spoke-like members or ligaments, positioned in the duct to provide an obstruction. These are more substantial than filaments of braided strands, but there is still no need to size the bars to a size any larger that that required to prevent the compressor from sucking foreign objects past it. Likewise they can be sized smaller than a conventional grille configured to withstand a collision impact force with a foreign object. Hence the grille member can still be made relatively light and small and will consequently will not cause significant obstruction to fluid flow through the duct.

Preferably the at least one grille member is hollow. The advantage of this is increased strength for a given size, lighter weight for a given size and enables use of the hollow passage as a duct for cabling, instrumentation or a heating device.

Preferably the at least one grille member is of circular cross section. Since the present invention employs a grille member which is smaller than a conventional grille used in such situations, there is no need to aerodynamically shape the grille members to reduce the impact to fluid flow past them. Hence relatively simple shapes, such as a substantially circular cross sectional member, can be used without the need to produce expensive and/or complex aerofoil shapes.

Preferably the at least one grille member is/are provided with a means for prevention of ice formation and/or removal of ice. The present invention may encounter chilled air or water and hence it may be required to prevent ice forming as ice separating from the grille member and passing downstream to impact on downstream components may cause damage.

Preferably the at least one grille member comprises an electrically conductive material. Being electrically conductive means the grille member can be used as a heating element. It also will have advantages in suppressing radar signals on military aircraft.

Preferably the means for the prevention and/or removal of ice comprises electrical heating elements fitted to the inside and/or outside of the at least one grille member. That is to say, electrical heaters can be installed on or in the grille members. If the grille members are hollow, the heaters can be fitted inside the members.

Preferably the means for the prevention of ice formation and/or removal of ice comprises a chamber formed within at least one grille member configured to be in flow communication with a source of hot fluid. That is to say anti-icing means could utilise air or water pumped through the grille members at a higher than ambient temperature, thereby heating the grille members above ice forming temperatures.

Hence the present invention provides a means for preventing the passage along a duct of objects over a size considered to be damaging to a component downstream of the intake of the duct, but that will not unduly increase the weight, affect the aerodynamics or hydrodynamics of the duct and will not unduly impact performance of the equipment associated with the duct.

Figure 2:
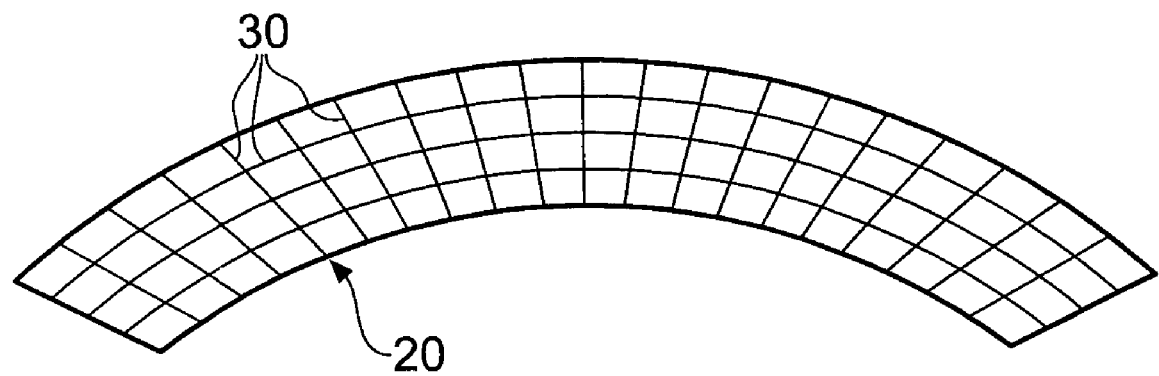
Figure 3:
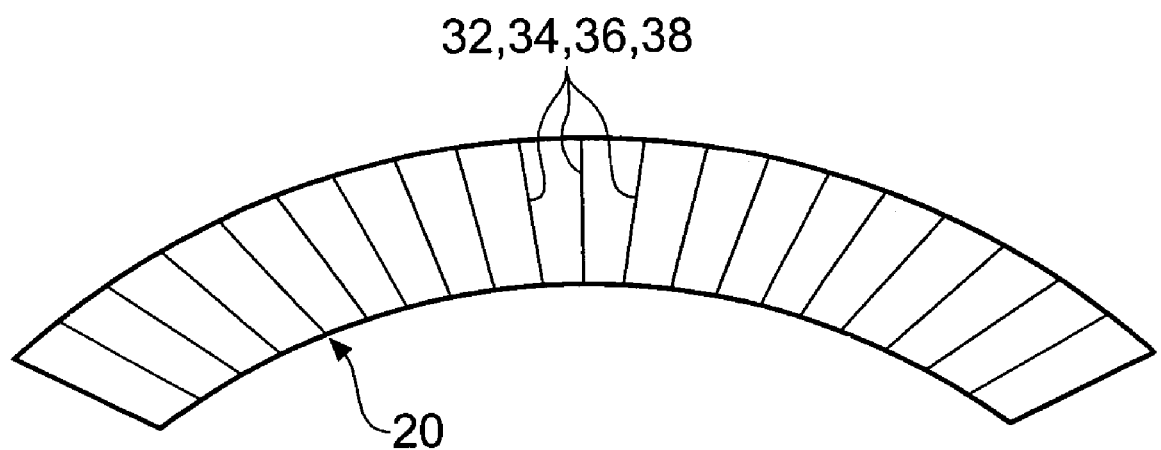

For a better understanding of the present invention, and to show more clearly how it may be carried into effect, reference will now be made, by way of example, to the accompanying drawings, in which:

FIG. 1: shows a cross-sectional view of an intake according to the present invention for a compressor of a gas turbine engine;

FIG. 2: shows a face on view of a grille member according to one embodiment of the present invention as seen from an viewpoint indicated by arrow "A" in FIG. 1; and FIG. 3: shows a face on view of a grille member according to an alternative embodiment of the present invention as seen from an viewpoint indicated by arrow "A" in FIG. 1.

An intake duct 10 according the present invention is presented in FIG. 1. In this embodiment the duct 10 provides an inlet flow path to a compressor (not shown) and is also configured as an inlet particle separator. The duct 10 has a serpentine path with an inlet 12 and a "Y" branch 14 downstream of the inlet 12. The "Y" branch 14 comprises a first outlet 16 and a second outlet 18. A grille member 20 is provided out of the line of sight of the inlet 12 inside the duct 10. That is to say, on viewing the inlet 12 from outside of the duct 10 from a position accessible when the duct is in use (e.g. fitted to a vehicle) it would not be able to see the grille member 20. The boundaries of the region of the duct in the line of sight in normal use are indicated in FIG. 1 by dotted lines 22 and 24.

FIG. 2 shows a view of the grille member 20 as seen from a viewpoint indicated by arrow "A" in FIG. 1. The grille member 20 is made up of a plurality of cross members 30 arranged in a mesh. In FIG. 2 a curved box shape duct is presented, although the present invention may be employed in any size or shape of duct, including, but not limited to, an annular, circular or rectangular duct.

FIG. 3 shows a view of an alternative embodiment of the grille member 20 as seen from a view point indicated by arrow "A" in FIG. 1. In this embodiment the grille member 20 is made up of a plurality of individual elements 32, which may be filaments 34, braided structures 36 or bars 38 which extend across the duct. In one embodiment the grille members 20 are hollow and have a circular cross section. The elements 32 are spaced apart from one another (or, if there is only one, from the duct side walls) such that the passage of objects larger than a predetermined size is prevented.

The mesh gap of FIG. 2 and the gap between the elements 32 of FIG. 3 are sized to prevent the passage of objects larger than a predetermined size. It will be appreciated that the gap size will be dependent upon the nature of the engine, the size and mass of object that can be reliably diverted to the first outlet 16 and the maximum size and type of object which the engine will be able to ingest before failure. Hence there is no absolute gap size.

During operation of the present invention, air enters the duct at the inlet 12, as indicated by arrow "B". It passes along the duct, past and through the grille member 20 until it reaches the "Y" branch 14. A proportion of the air will leave the intake duct through the first outlet 16, as indicated by arrow "C", along with any foreign objects not capable of being airborne which have entered the system and passed through the grille member 20. The first outlet 16 may lead directly overboard, thereby ejecting air and objects from the engine system or may lead to a trap to retain the objects whilst directing the air overboard or to the compressor. The majority of the air, plus any airborne particulates, exit the duct 10 at outlet 18, as indicated by arrow "D". The geometry of the duct upstream of the "Y" branch is such that the mass of non air borne particles causes them to be thrown in a direction away from the second outlet 18 and towards first outlet 16. That is to say, objects having sufficient mass which means they are not borne by the air flowing through the duct are directed towards the wall at the "top" of the duct (i.e. side of the duct at the top of FIG. 1) where their momentum will carry them to the first outlet 16. Objects trapped against the "top" of the duct will also tend to be pushed by the airflow to the first outlet 16.

In the eventuality of a large foreign object entering the inlet 12, in the direction of arrow "B", it will first collide with the duct wall in the impact region 40 (as indicated by the dotted ellipse in FIG. 1). Because of the configuration of the present invention, wherein the grille member 20 is out of the line of sight of the inlet 12, a large non airborne foreign object will impact the side wall of the duct before colliding with the grille member 20. Having impacted the duct wall the object will have lost much of its kinetic energy and will either rebound out of the duct 10, stay impacted on the wall, be broken into pieces or drawn towards the grille member 20. If the object has not been broken into pieces smaller than the gap size between the grille members 20, the object cannot pass beyond the grille member 20.

An advantage of the present invention is that the or each grille member 20 is positioned such that it does not suffer the direct impact of a bird or other foreign object entering the engine intake duct 12. This obviates the need for the mesh 30, filament 34, braid 36 or bars 38 to have a very high impact resistance which in turn allows them to be relatively small. Additionally, since the duct also utilises an inlet particle separator (i.e. directing air and non airborne objects to first outlet 16 so that only small airborne objects are ingested by the compressor via the second outlet 18, flow passages through the grille member 20 do not need to be as small as for a system which does not have an inlet particle separator since the grille 20 does not need to prevent the passage of all objects entering the duct 10. Hence the grille member 20 has low aerodynamic loss because it obstructs the fluid flow path to only a limited degree and low weight since it need not be as large, extensive or robust as a grille which has to arrest the motion of and/or block passage of all objects. Since the mesh 30, filament 34, braid 36 or bars 38 have a low aerodynamic loss, they can be of a circular section which is simpler to manufacture than a profiled section. Additionally, since the mesh 30, filament 34, braid 36 or bars 38 have a low strength requirement this permits them to be made hollow, which, in some embodiments, enables the cavity within them to be utilised for anti-icing means.

In operation the present invention may encounter chilled air and hence will be required to prevent ice forming to prevent damage by ice separating from the grille member 20 and passing downstream to impact on downstream components. The means for the prevention and/or removal of ice may comprise electrical heating elements installed on or in the grille members. If the grille members are hollow, the heaters can be fitted inside the members.

In another embodiment a chamber formed within at least one of the one grille members 20 is configured to be in flow communication with a source of hot fluid, and thereby provides anti-icing means that utilise air or water pumped through the grille members 20 at a higher than ambient temperature, thereby heating the grille members 20.

Whether used as a heating element or not, the or each grille member 20 is provided with an electrically conductive material, either painted on the surface, provided as a part of the surface or wound around the periphery of the member. Being electrically conductive means the grille member can be used as a heating element. It also will have advantages in suppressing radar signals on military aircraft.

The present invention could be utilised on any engine or induction system, such as, by way of non limiting example, a gas turbine fitted to an aircraft or other vehicle. Additionally it could be utilised in any high flow engines where filtration is not practical, or where foreign objects could block a filter such as, by way of non limiting example, wind-tunnels, marine jet propulsion systems or hydro-electric generators.

The mesh 30, filament 34, braid 36 or bars 38 can be made from any suitable material, such as steel, alloys of steel, Kevlar or nylon. If formed into a braid 36, the structure could be held flat or in a circular profile to improve aerodynamics. Such braid 36 could have an electrically resistant over-braid for heating. The over-braid angle and lay-up could be such that it stretches more easily than the mesh 30, filament 34, braid 36 or bars 38 beneath, which will reduce the load on the heating braid when a foreign object comes into contact with it.

The invention claimed is:

1. An intake duct for a compressor comprises an inlet and branched outlet means and there between a serpentine path, the branched outlet means having a first outlet and a second outlet
    wherein said duct further comprises at least one grille member configured to prevent the passage of objects over a predetermined size and said at least one grille member is positioned at a distance upstream at the branched outlet means out of the line of sight when viewed through the inlet when the duct is in an installed condition, and
    the duct is shaped such that in operation objects passing through the at least one grille member greater than a predetermined mass are directed towards the first outlet and the remainder of the objects passing through the at least one grille member are directed towards the second outlet.

2. An intake duct as claimed in claim 1 wherein the first outlet is upstream of the second outlet.

3. An intake duct as claimed in claim 1 wherein the first outlet leads overboard and/or to a trap.

4. An intake duct as claimed in claim 1 wherein the second outlet leads to a compressor.

5. An intake duct as claimed in claim 1 wherein the at least one grille member is a mesh.

6. An intake duct as claimed in claim 1 wherein the at least one grille member is a filament which extends across the duct.

7. An intake duct as claimed in claim 1 wherein the or each grille member is a bar which extends across the duct.

8. An intake duct as claimed in claim 1 wherein the at least one grille member is hollow.

9. An intake duct as claimed in claim 1 wherein the at least one grille member is of circular cross section.

10. An intake duct as claimed in claim 1 wherein the at least one grille member is/are provided with a means for prevention of ice formation and/or removal of ice.

11. An intake duct as claimed in claim 1 wherein the at least one grille member comprises an electrically conductive material.

12. An intake duct as claimed claim 10 wherein the means for the prevention and/or removal of ice comprises electrical heating elements fitted to the inside and/or outside of the at least one grille member.

13. An intake duct as claimed claim 10 wherein the means for the prevention of ice formation and/or removal of ice comprises a chamber formed within the at least one grille member configured to be in flow communication with a source of hot fluid.

14. An intake duct as claimed in claim 2 wherein the or each grille member is a filament which extends across the duct.

15. An intake duct as claimed in claim 3 wherein the or each grille member is a filament which extends across the duct.

16. An intake duct as claimed in claim 4 wherein the or each grille member is a filament which extends across the duct.

17. An intake duct as claimed in claim 5 wherein the or each grille member is a filament which extends across the duct.

18. An intake duct as claimed in claim 1 wherein the grille member being higher than the intake of the duct in a vertical direction.

* * * * *